United States Patent Office 3,414,199
Patented Dec. 3, 1968

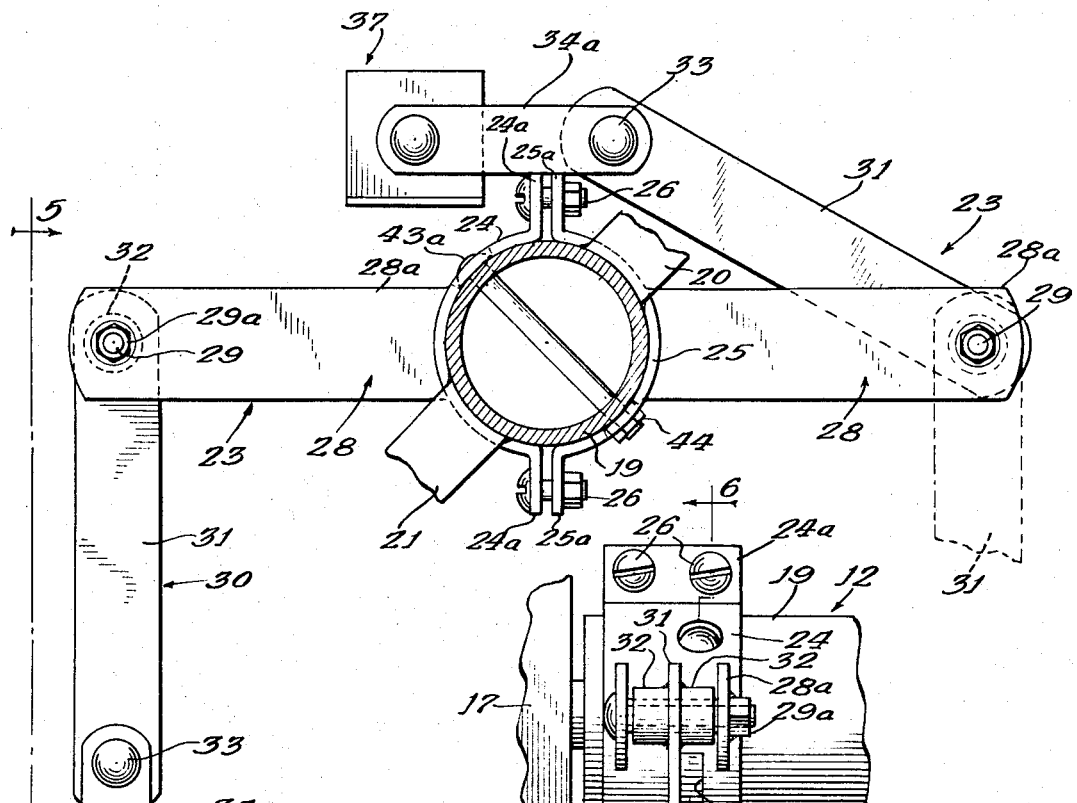
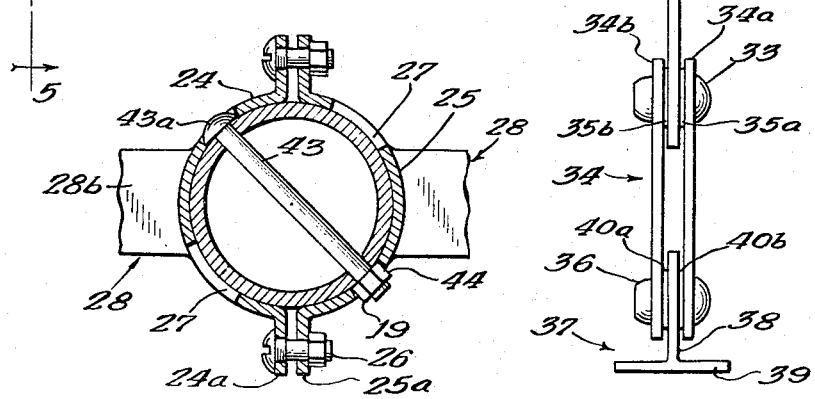

1

3,414,199
STARTER MEANS FOR FLAIL-TYPE
MATERIAL SPREADER
Robert G. Ferris, Harvard, Ill., assignor to Starline, Inc.,
a corporation of Illinois
Filed Sept. 16, 1965, Ser. No. 487,728
17 Claims. (Cl. 239—658)

ABSTRACT OF THE DISCLOSURE

A flail type material spreader is provided at either one or both ends of the shaft with a specialized flail structure in the form of a short radial rigid bar on the shaft, a first arm relatively loosely pivoted at the outer end of the bar, a second arm relatively loosely pivoted at the outer end of the first arm, and a flail head relatively loosely pivoted at the outer end of the second arm, with all three pivots parallel to the axis of the shaft and the total play on the pivots being small enough that the flail head cannot strike the container end wall. The described double jointed structure eliminates flail and shaft damage found in prior art single jointed end flails.

---

The type of spreader disclosed in Elwick Patent No. 2,886,332 and Harris Patent No. 2,886,333 is provided with a container that has end walls connected by a side wall which occupies a segment of a cylinder, and a shaft on the axis of the cylinder extends between the end walls and may be rotated so that the flexible flails on the shaft may discharge material from the container over the side wall. The flails are capable of winding around the shaft, and as the shaft rotates the flails first discharge material from close around the shaft, and extend outwardly toward the side wall as the container is unloaded.

Elwick Patent No. 3,048,409 deals with the problem of starting the unloading action in a spreader of the present type. A farmer using a spreader wishes to put the largest possible load in it, and this means putting material into the container high above the level of the shaft. Under these conditions the flexible flail members which are wrapped around the shaft simply make a tunnel in the material unless there is some more rigid element which can start the unloading of the material and thus give some of the flexible flails room to start unwinding. In said Elwick Patent 3,048,409 the starter means consists of an auger which is mounted on the shaft and extends a short distance radially therefrom. The auger moves material endwise of the shaft, either to one or both ends, and a pivoted arm at an end of the shaft acts as an opener to start the unloading.

Commercial spreaders constructed in accordance with the teaching of Elwick Patent 2,886,332 have commonly had a rigid bar extending radially from the shaft adjacent one, or both end walls, and a heavy arm pivoted at the end of the bar. Some commercial units combine the last described structure with the helical starter means of Elwick Patent 3,048,409, while others use only the rigid bar and heavy pivoted arm—i.e., a hinged flail, for an opener.

In wintertime operations in climates where liquid residues may freeze in the bottom of the container, users of flail type spreaders have reported excessive component failures in the pivoted opener flails. The swinging arms are constructed with hollow bosses welded to their two sides to provide a pivot hub, and in some instances the welds were breaking between the pivoted arm and the bosses. In other instances the pivot pin sheared. When both the weld and the pin were reinforced, the whole assembly might tear loose from the rotor shaft. When this point of weakness was corrected, there was excessive shear pin failure at the front end of the rotor and in turn breakage of the shear hub itself if the shear pin was strengthened.

Applicant made a very careful study of the operating characteristics of the structure, and discovered that the hinged opener flail, which had been assumed to occupy a true radial position, or lag behind the radial line, was actually leading the true radial line so that it was being driven endwise into any frozen residue in the bottom of the container. This, of course, produced an enormous shock tending to break the welds and shear the pivot pins. Further study showed that this unexpected action of the hinged flail was due to a non-uniform cycle of rotation of the rotor, or unloader shaft, resulting from the fact that the engagement of the chain flails with the material in the container actually produces a sine wave in a rotational pattern, and this pattern caused the hinged flail to lead its true radial line in a portion of the cycle.

When the nature of the problem was discovered, applicant developed the structure disclosed in the present application as a means of eliminating the component failure problems which result from using a single hinged flail opener. The present structure includes a rigid bar welded adjacent an end of the shaft in parallel relationship to an end wall of the container, a first arm pivoted at the outer end of the bar, a second arm pivoted at the outer end of the first arm, and a flail head pivoted at the outer end of the second arm. All the pivots are parallel to the shaft, so that the multiple jointed opener has adequate flexibility in the plane of rotation. Even if the arms of the opener lead a true radial line, the flail head cannot be driven endwise into frozen residue in the bottom of the container.

Pivoted or hinged components of the present type are subjected to the highly corrosive action of the acids in animal waste products, and unless the jointed flail is to freeze due to corrosion after a relatively small amount of use, it is necessary to provide a certain amount of looseness or play at the pivots. This, of course, results in a certain amount of flexibility in a longitudinal direction of the container. The play at the three pivots is controlled, and is so related to the distance from the rigid flail bar to the adjacent end of the container that the flail head cannot strike the container end wall even if the inevitable irregularities of density in the material of the container cause both arms and the flail head to swing in the same direction on their pivots.

Further, careful testing and observation of the type of opener here disclosed has developed the fact that the structure which provides the most efficient opener also tends to produce excessive horsepower requirements in the initial stages of operation of the spreader. The present dimensions as herein disclosed have been found to afford what applicant believes to be the most satisfactory compromise between optimum opener function and minimum horsepower.

Specifically, the rigid bar on the shaft provides from 25 to about 33% of the length of the opener, the flail head member provides about 5 to 10% of said length, and the two hinged arms provide the balance of the length with the first arm (pivoted on the rigid bar) being about twice as long as the second arm. As stated in another way, the first arm member is about twice as long as the second arm member, the length of the flail head member is about a third that of the second arm member, and the length of the bar means is intermediate those of the two arm members.

Finally, for a practical commercial structure a spreader must be readily supplied either with a single opener flail or with two opener flails. To accomplish this, the end flails or opener flails are mounted on collars which may be clamped onto the shaft. All commercial spreaders of the present type are provided with two lines of bosses to receive the flexible flails. The lines of bosses are 180° apart, and each row consists of alternate bosses. The end flail collars are provided with holes that are impaled by one of the bosses so as to fix the radial position of each end flail with respect to the flexible flails. Ideally, if a hinged flail were to be placed only at one end of the spreader, the radial direction of the hinged flail rigid bar would be 90° to the radial positions of the chain flails. Because a large percentage of the spreaders have hinged flails at both ends, extensive power curve studies have been made which show that the most satisfactory arrangement places the end flail bars on radii which are 45° on opposite sides of one of the lines of flexible flail bosses. This makes it possible to provide a farmer with a single type of collar and hinged flail structure to produce the best average results whether there is a jointed opener flail at one end of the container or at both ends of the container.

The invention is illustrated in a preferred embodiment in the accompanying drawings in which:

FIG. 4 is a fragmentary section on an enlarged scale, taken substantially as indicated along the line 4—4 of FIG. 1, with the shaft rotated 45° clockwise and with the flexible flails and flail bosses broken away for clarity of illustration;

FIG. 5 is a fragmentary sectional view taken substantially as indicated along the line 5—5 of FIG. 4; and FIG. 6 is a fragmentary sectional view on a reduced scale taken substantially as indicated along the line 6—6 of FIG. 5.

Figure 1:
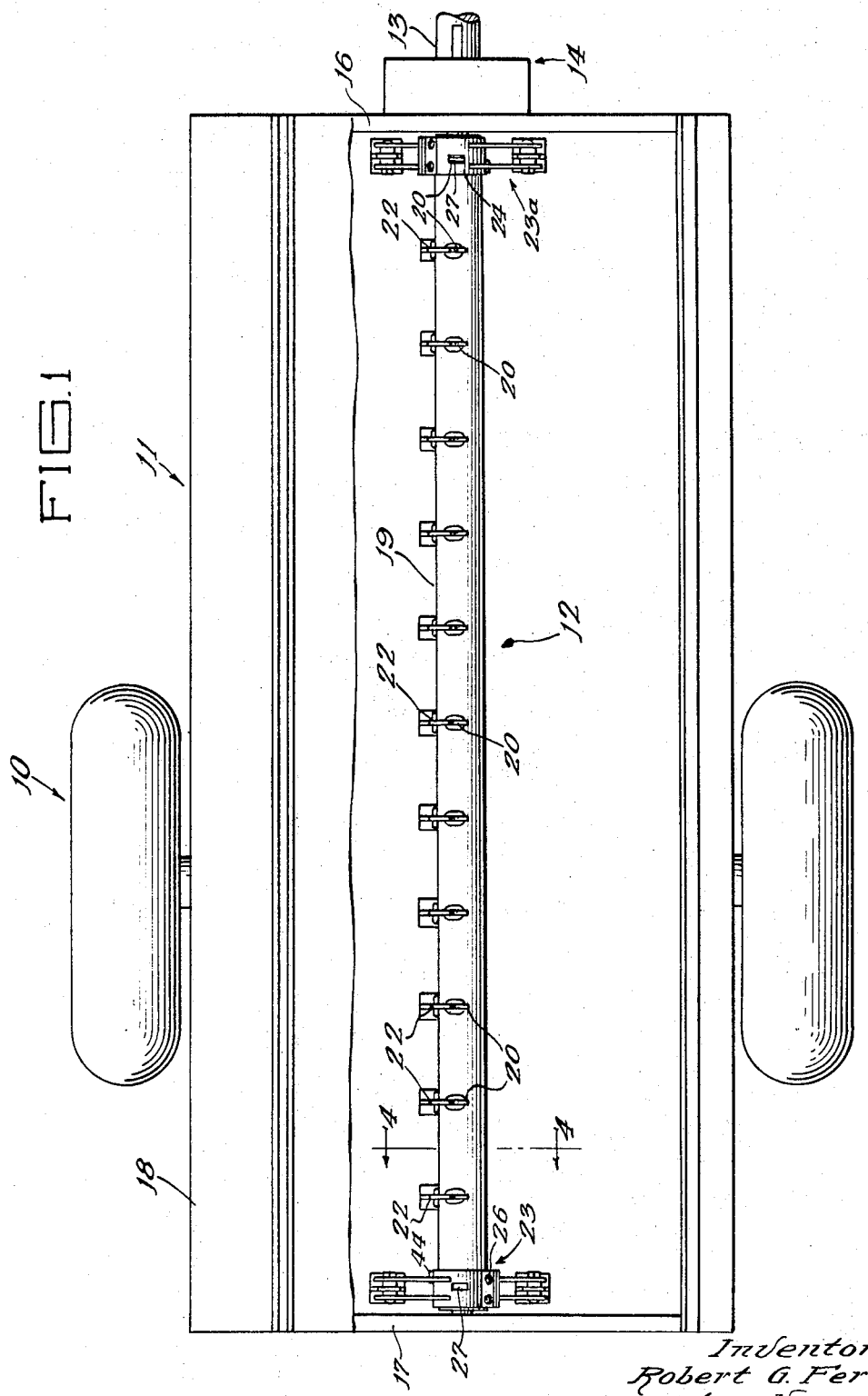
FIG. 1 is a plan view of the flail type spreader equipped with the hinged end, or opener flails of the present invention.
Figure 2:
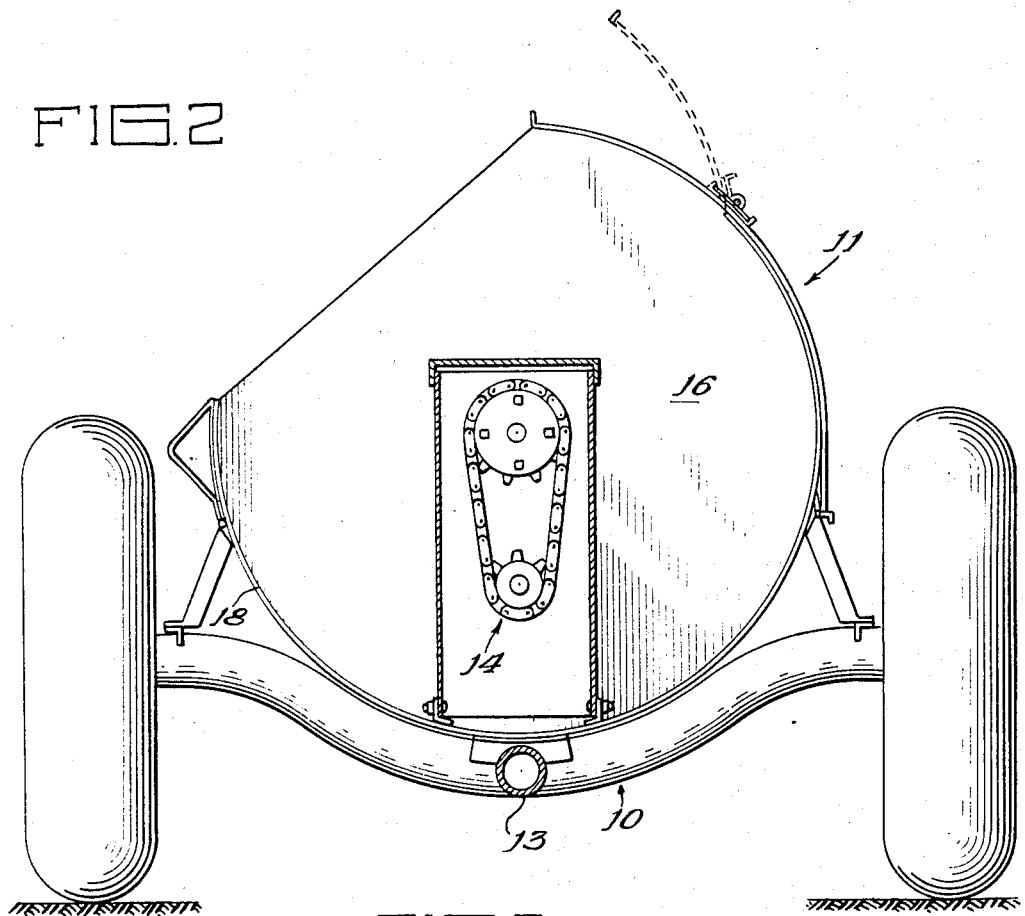
FIG. 2 is a front elevational view of such a spreader.
Figure 3:
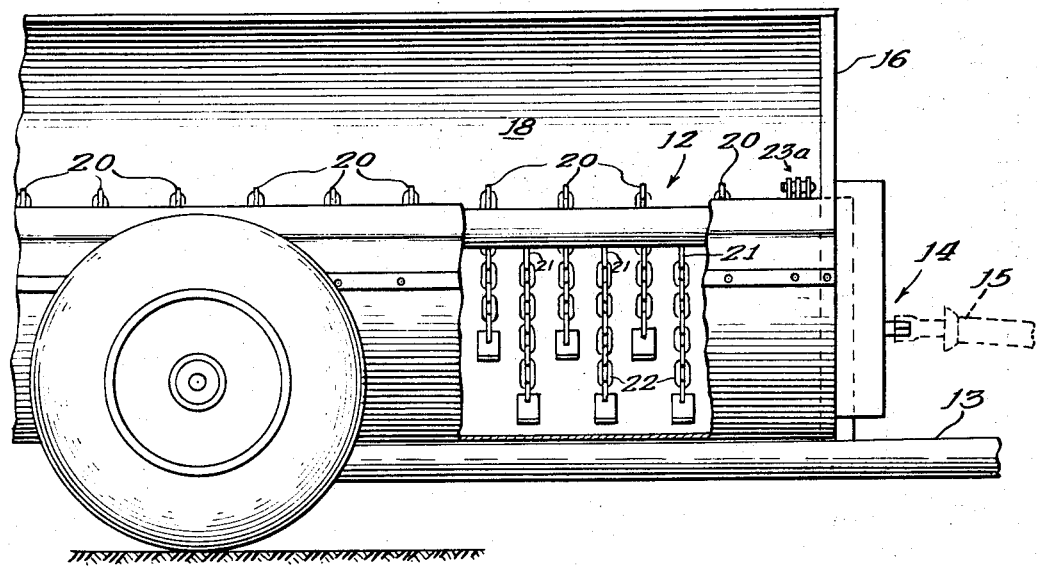
FIG. 3 is a fragmentary side elevational view on a reduced scale, with parts broken away to show the flexible flails on the shaft.

Referring to the drawings in greater detail, and referring first to FIGS. 1 to 3, a flail type material spreader includes a carriage indicated generally at 10, a container indicated generally at 11, a spreader shaft or rotor assembly, indicated generally at 12, a hitch tongue 13, and a power train, indicated generally at 14, by means of which the shaft 12 may be driven through a slip tube connection 15 from the power take-off of a farm tractor (not shown). The particular carriage and container structure illustrated in the drawings is described in more detail and claimed in the copending application of Robert L. Yuenger, deceased, Howard J. Ferris and Robert G. Ferris, Ser. No. 419,280; now Patent No. 3,229,985 filed Dec. 11, 1964 as a continuation-in-part of application 223,618 filed Sept. 14, 1962 now abandoned.

The container 11 includes a front end wall 16, a rear end wall 17, and a side wall 18 which is connected to both end walls and forms a segment of a cylinder. The spreader shaft or rotor assembly 12 is journaled substantially on the longitudinal axis of the cylinder.

Referring now especially to FIGS. 1 and 3, the shaft assembly 12 includes a tubular shaft 19, and two rows of radially extended bosses 20 and 21, the rows being 180° apart and each row consisting of alternate bosses. Each of the bosses 20 and 21 carries a flexible flail 22 which is capable of winding around the cylinder 19 and extending gradually as material is flung from the container as the shaft is driven. The spreader shaft assembly as just described is, generally, common to all flail type material spreaders.

Referring now particularly to FIGS. 1, 4 and 5, in accordance with the present invention the shaft assembly is provided, close adjacent the front and rear end walls 16 and 17 of the container, with a rear end hinged opener flail assembly having two flail members 23, and with an identical front end hinged opener flail assembly having two flail members 23a. As best seen in FIG. 4, which shows the rear end flail in a typical position of rest with one pivoted arm hanging down and the other lying over the shaft tube 19, the rear end flail members 23 are 45° clockwise with respect to the lines of bosses 20 and 21. FIG. 1 shows, by comparison, that the front end flail members 23a are 45° counter clockwise with respect to said bosses; so the end flail members 23 and 23a are offset by 90° from one another.

The two end flail assemblies are identical, so only the rear assembly is described in detail. It consists of two collar halves 24 and 25 which have radial ears 24a and 25a permitting the collar halves to be secured together by nuts and bolts 26 which clamp them on the shaft 19. As best seen in FIG. 1, the collar half 24 has a rectangular opening 27 which, in the case of the front opener flail assembly, receives one of the bosses 20. There is no corresponding boss 20 at the extreme rear of shaft 19, so in the rear assembly the opening 27 has no function.

All four of the flail members 23 and 23a are identical, so only one of the members 23 is described in detail.

Welded to the collar half 24 is a rigid bar means, indicated generally at 28, which is best seen in FIG. 5 to consist of a pair of parallel bars 28a and 28b which have square holes adjacent their outer ends to receive a short carriage bolt 29 that provides a first pivot for a swingingly mounted first arm member 30, and a nut 29a for the carriage bolt is welded into place. The first arm member 30 consists of a piece of flat stock 31 which has a hole at its inner end to receive the shank of the carriage bolt 29, and a pair of hollow bosses or spacer tubes 32 are welded to opposite faces of the member 31 to provide a hub for the first arm member 30.

At the outer end of the first arm member 30 is a rivet 33 the shank of which projects from both sides of said arm member to provide a second pivot, and swingingly mounted on the second pivot is a second arm member 34. As seen in FIG. 5, the arm member 34 consists of a pair of flat bars 34a and 34b which have openings in their inner ends, so that the bars are swingingly mounted on the pivot afforded by the rivit 33 and flank the outer end portion of the first arm member 30.

At the outer end of the second arm member 34 is a rivet 36 the shank of which extends between the bar members 34a and 34b to provide a third pivot on which a flail head member, indicated generally at 37, is swingingly mounted. The flail head member 37 includes a fastening shank 38 which is apertured to receive the pivot provided by the shank of the rivet 36 and a transverse tip plate 39 of the flail head forms the crossbar of a T of which the shank 38 is the stem.

To prevent rotary or endwise slippage of the collar halves when the spreader is used, as best seen in FIG. 6 the two collar halves 24 and 25 are provided with holes 41 and 42 that are 180° apart when the collar halves are assembled on the tube, and a bolt 43 having a head 43a extends through the tube and is secured by a nut 42. The bolt head 43a occupies the hole 41 and the nut 44 occupies the hole 42, so the bolt and nut act as studs to prevent any slippage of the collar.

As previously indicated, it is necessary that the end flail have a controlled amount of play between each of the three pivots 29, 33 and 36, and the three members 30, 34 and 37 which are swingingly mounted on the pivots. For this purpose, there is a difference of $\frac{1}{16}''$ to about $\frac{3}{32}''$ between the outside diameter of the pivot and the diameter of the hole by which any one of the members is swingingly supported on the pivot.

In addition, when the flail member is assembled it is provided with paper washers 35a and 35b that provide destructible spacers between the first arm member 30 and the bar members 34a and 34b of the second arm member 34, so the heads at the two ends of the rivet 33 may be driven tightly against said bar members and expand into the openings in the bar members and form a rigid assembly. Similarly, paper washers 40a and 40b provide destructible spacers between the outer ends of the bar members 34a and 34b and the shank 38 of the flail head so the heads of the rivet 36 may be driven tightly against the bar members and into the holes therein to form a rigid assembly therewith. Thus, the bar members 34a and 34b and the rivets 33 and 36 provide a sort of rigid, box-like unit in operation. The paper washers in actual practice are .031" thick, and all of them are destroyed the first time the spreader is operated so that there is a predetermined amount of play between the arm member 30 and the arm member 34, and between the arm member 34 and the flail head member 37.

The actual dimensions of a commercial flail 23 or 23a constructed in accordance with the present disclosure are as follows:

| | Inches |
|---|---|
| Pitch length of bar means 28 (from outer surface of clamp half 24 to center of pivot provided by shank of bolt 29) | 6 3/16 |
| Pitch length of first arm member 30 | 9 1/4 |
| Pitch length of second arm member 34 | 4 1/2 |
| Length of flail head 37 from center of third pivot to outer surface of tip plate 39 | 1 1/2 |

With the above stated differences in diameter between the three pivots and the three members which are swung thereon, with the play provided between the member by destruction of the .031" thick washers, and with the above stated dimensions of the various elements of the pivoted end flail, the near side of the flail head tip plate 39 may be as little as 1/4 inch from the adjacent end wall of the container and not strike the end wall with maximum deflection of the end flail in that direction.

Comparison of the rear and front end flail assemblies in FIG. 1 shows that the collars are reversed, so that in each case the holes 41 and 42 for the studs provided by the bolt heals 43a and nuts 44 are at the side of the collar remote from the adjacent end wall. This assures that in each case the bolt head 29 of each end flail is toward the wall, and the projecting nut 29a is away from the wall. This is important, because material from the container can be caught around the nut 29a, and if that were adjacent the end wall the material could jam between the nut and the wall and wear a groove in the wall. This cannot occur with the half-round head of the bolt 29 adjacent the wall.

As previously indicated the end flails 23 and 23a may be used either at one or both ends of the shaft assembly 12, but the use of such flails at both ends provides more uniform and rapid spreading. However, it also increases the power requirements, so whether one or two end flails are used depends on the horsepower of the tractor by which the spreader is moved and driven.

In the case of a spreader which delivers to one side of the line of travel, rather than to the rear, if a single end flail 23 is used it is placed at the rear of the spreader so the first material goes out of the rear end portion of the container and does not cause the unbalanced load to lift up the rear of the tractor.

The foregoing detailed description is given for clearness of understanding only and no unnecessary limitations should be understood therefrom, as modifications will be obvious to those skilled in the art.

I claim:

1. In a flail type material spreader having a container with end walls, a side wall that connects the end walls and occupies a segment of a cylinder, a shaft substantially on the longitudinal axis of said cylinder, a plurality of flexible flail members attached in lines along said shaft in spaced relationship to one another and capable of winding around the shaft, and means for rotating the shaft to cause said flail members to discharge material over said side wall, an end flail member comprising, in combination: rigid bar means on said shaft in close parallel relationship to an adjacent one of said end walls; a first pivot pin adjacent the outer end of said bar means and parallel to the shaft; a first arm member swingingly mounted on said first pivot pin; a second pivot pin adjacent the outer end of the first arm member and parallel to the shaft; a second arm member swingingly mounted on said second pivot pin; and a flail head member at the outer end of said second arm member, the combined length of said bar means, said two arm members and said flail head member being such that when the end flail member is extended radially from the shaft the flail head member is close to the side wall.

2. The end flail member of claim 1 which includes a third pivot pin adjacent the outer end of the second arm member and parallel to the shaft, and in which the flail head member is swingingly mounted on said third pivot pin.

3. The end flail member of claim 2 in which the bar means comprises two parallel bars, the first pivot pin extends between the outer end portions of said parallel bars, the first arm is a unitary member substantially narrower than the space between the parallel bars, spacer tubes surround the first pivot pin flanking the first arm member, the second pivot pin projects from both sides of the outer end of said first arm member, the second arm member consists of a pair of identical arms the inner ends of which are on the second pivot pin flanking the outer end portion of the first arm member and slightly spaced therefrom, the third pivot pin extends between the outer end portions of said identical arms and the flail head member has a connecting portion which is on the third pivot pin between the outer end portions of the links forming the second arm member.

4. The end flail member of claim 1 in which there is a small amount of play between each pivot pin and the member which is swingingly mounted on it, the total amount of play between said pins and said swingingly mounted members and the distance of the bar means from the adjacent end wall being so related that the flail head member cannot strike the end wall.

5. The end flail of claim 1 in which there is a destructible spacer on the second pivot pin fixing the space between the first arm member and the second arm member along said pin, said spacer being of a material which is promptly destroyed when the spreader is first operated.

6. The end flail of claim 2 in which there is a destructible spacer on at least one of the second and third pivot pins fixing the space between the second arm member and the other member on said pin, said spacer being of a material which is promptly destroyed when the spreader is first operated.

7. The end flail member of claim 1 in which the bar means is welded to a collar, and means are provided for clamping the collar onto the shaft.

8. The end flail member of claim 1 in which the bar means occupies about 25% to 33% of the total length of the flail and the flail head member occupies about 5% to 10% of said length, the balance being occupied by the first and second arm members.

9. The end flail member of claim 8 in which the first arm member is about twice as long as the second arm member.

10. The end flail member of claim 1 in which the first arm member is about twice as long as the second arm member, the length of the flailhead member is about 1/3 that of the second ram member, and the length of the bar means is intermediate those of the two arm members.

11. In a flail type material spreader having a container with ends walls, a side wall that connects the end walls and occupies a segment of a cylinder, a shaft substantially on the longitudinal axis of said cylinder, a plurality of flexible flail members attached in lines along said shaft in spaced relationship to one another and capable of winding around the shaft, and means for rotating the shaft to cause said flail members to discharge material over said side wall, an end flail assembly comprising, in combination: a pair of diametrically opposite radial studs adjacent an end of the shaft; a pair of cooperating collar halves having diametrically positioned holes; means clamping said collar halves around the shaft with the holes impaled by the studs to secure the end flail assembly immovably on the shaft; and an end flail member on each collar half said end flail members on the two collar halves being identical and being diametrically opposite one another, each said end flail member comprising radial rigid bar means, a first pivot pin adjacent the outer end of said bar means and parallel to the shaft; a first arm member swingingly mounted on said first pivot pin; a second pivot pin adjacent the outer end of the first arm member and parallel to the shaft; a second arm member swingingly mounted on said second pivot pin; and a flail head member at the outer end of said second arm member, the combined length of said bar means, said arm members and said flail head member being such that when the end flail member is extended radially from the shaft the flail head member is close to the side wall.

12. The end flail member of claim 11 which includes a third pivot pin adjacent the outer end of the second arm member and parallel to the shaft, and in which the flail head member is swingingly mounted on said third pivot pin.

13. The end flail member of claim 12 in which the bar means comprises two parallel bars, the first pivot pin extends between the outer end portions of said parallel bars, the first arm is a unitary member substantially narrower than the space between the parallel bars, spacer tubes surround the first pivot pin flanking the first arm member, the second pivot pin projects from both sides of said firm arm member, the second arm member consists of a pair of identical arms the inner ends of which are on the second pivot pin flanking the outer end portion of the first arm member and slightly spaced therefrom the third pivot pin extends between the outer end portions of said identical arms and the flail head member has a connecting portion which is on the third pivot pin between the outer end portions of the links forming the second arm member.

14. In a flail type material spreader having a container with end walls and a side wall that connects the end walls and occupies a segment of a circle, unloading means comprising, in combination: a shaft extending from end to end of the container substantially on the cylinder axis; two rows of radial bosses on the shaft 180° apart and with alternate bosses in each of said rows; a flexible flail member pivoted on each boss, each of said flail members being capable of winding around the shaft; and end flail members at the two ends of the shaft close adjacent the end walls, each of said end flail members including rigid bar means on said shaft in close parallel relationship to an adjacent one of said end walls; a first pivot pin adjacent the outer end of said bar means and parallel to the shaft; a first arm member swingingly mounted on said first pivot pin; a second pivot pin adjacent the outer end of the first arm member and parallel to the shaft; a second arm member swingingly mounted on said second pivot pin; and a flail head member at the outer end of said second arm member, the combined length of said bar, two arm members and said flail head member being such that when the end flail is extended radially from the shaft the flail head member is close to the wall, the bars of said end flails extending along different radii of the shaft.

15. The combination of claim 14 in which each end flail member includes a third pivot pin adjacent the outer end of the second arm member and parallel to the shaft, and in which the flail head member is swingingly mounted on said third pivot pin.

16. The combination of claim 14 in which the bar means of the end flails are on radii of the shaft which are about 45° on opposite sides of a longitudinal plane through one of the rows of bosses.

17. In a flail type material spreader having a container with end walls, a side wall that connects the end walls and occupies a segment of a cylinder, a shaft substantially on the longitudinal axis of said cylinder, said shaft having a pair of diametrical radial studs close adjacent one end wall of the container, a plurality of flexible flail members attached in lines along said shaft in spaced relationship to one another and capable of winding around the shaft, and means for rotating the shaft to cause said flail members to discharge material over said side wall, and end flail member comprising, in combination: a collar having diametrical holes the margins of which closely surround the diametrical studs on the shaft; means clamping said collar onto the shaft so that engagement of said studs with said hole margins fixes the position of the collar on the shaft; rigid bar means on said collar in close parallel relationship to said adjacent one of said end walls; a first pivot pin adjacent the outer end of said bar means and parallel to the shaft; a first arm member swingingly mounted on said first pivot pin; a second pivot pin adjacent the outer end of the first arm member and parallel to the shaft; a second arm member swingingly mounted on said second pivot pin; and a flail head member at the outer end of said second arm member, the combined length of said bar means, said arm members and said flail head member being such that when the end flail member is extended radially from the shaft the flail head member is close to the side wall.

References Cited

UNITED STATES PATENTS

| | | | |
|---|---|---|---|
| 567,622 | 9/1896 | Stephens | 172—45 |
| 2,545,590 | 3/1951 | Settergren et al. | 172—45 |
| 2,585,296 | 2/1952 | Bennett et al. | 172—45 |
| 2,886,332 | 5/1959 | Elwick | 239—658 |
| 3,015,188 | 1/1962 | Reinecker et al. | 172—45 X |
| 3,099,121 | 7/1963 | McCollum. | |
| 3,136,556 | 6/1964 | Wilkes et al. | 239—658 |
| 3,161,412 | 12/1964 | Ferris | 239—658 |
| 3,173,693 | 3/1965 | Skromme | 239—658 |
| 3,195,899 | 7/1965 | Neuenschwander | 239—658 X |
| 3,211,461 | 10/1965 | Elwick | 239—658 |

M. HENSON WOOD, Jr., *Primary Examiner.*

V. C. WILKS, *Assistant Examiner.*